(12) United States Patent
Nahum

(10) Patent No.: US 10,584,955 B2
(45) Date of Patent: Mar. 10, 2020

(54) COMBINED WORKPIECE HOLDER AND CALIBRATION PROFILE CONFIGURATION FOR PRECISION SURFACE PROFILE MEASUREMENT

(71) Applicant: Mitutoyo Corporation, Kanagawa-ken (JP)

(72) Inventor: Michael Nahum, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 16/023,194

(22) Filed: Jun. 29, 2018

(65) Prior Publication Data

US 2020/0003544 A1 Jan. 2, 2020

(51) Int. Cl.
*G01B 9/02* (2006.01)
*G01B 11/02* (2006.01)
*G01B 11/30* (2006.01)

(52) U.S. Cl.
CPC .......... *G01B 9/02074* (2013.01); *G01B 11/30* (2013.01)

(58) Field of Classification Search
CPC ............... G01B 21/045; G01B 21/042; G01B 2210/50; G01B 9/02074; G01B 11/30; G01B 11/0608; G01B 9/2074; G01J 3/02; G01J 3/0208; G01J 3/0218; G01J 3/0272; G01J 3/2803; G02B 6/4246; G02B 6/4298
See application file for complete search history.

(56) References Cited

U.S. PATENT DOCUMENTS

| | | | |
|---|---|---|---|
| 5,129,724 A * | 7/1992 | Brophy | G01B 11/0608 356/503 |
| 5,847,819 A * | 12/1998 | Yanagi | G01M 11/0207 356/124 |
| 5,973,772 A | 10/1999 | Fukuma et al. | |
| 6,542,249 B1 * | 4/2003 | Kofman | G01B 11/2513 356/601 |
| 7,400,414 B2 | 7/2008 | Tobiason et al. | |
| 7,738,113 B1 | 6/2010 | Marx et al. | |
| 7,876,456 B2 | 1/2011 | Sesko | |
| 9,958,266 B2 | 5/2018 | Patzwald et al. | |
| 2004/0200085 A1 * | 10/2004 | Sakata | G01B 7/12 33/550 |

(Continued)

*Primary Examiner* — Sang H Nguyen
(74) *Attorney, Agent, or Firm* — Seed IP Law Group LLP

(57) ABSTRACT

A combined workpiece holder and calibration profile configuration (CWHACPC) is provided for integration into a surface profile measurement system. The CWHACPC may comprise at least a first calibration profile portion and a workpiece holding portion that holds a workpiece in a stable position during measurement. The first calibration profile portion comprises a plurality of reference surface regions that have known reference surface z heights or z height differences relative to one another. The first calibration profile portion and the workpiece holding portion are configured to fit within a profile scan path range of the surface profile measurement system, such that the surface profile measurement system can acquire measured surface profile data for the first calibration profile portion and the workpiece during a single pass along the profile scan path. The acquired surface profile data for the reference surface regions may be used to indicate and/or correct certain errors.

10 Claims, 3 Drawing Sheets

(56) References Cited

U.S. PATENT DOCUMENTS

| | | | |
|---|---|---|---|
| 2008/0032066 A1* | 2/2008 | Stiblert | G03F 7/70391 427/595 |
| 2010/0283989 A1* | 11/2010 | Sesko | G01B 11/0608 356/4.04 |
| 2013/0135715 A1* | 5/2013 | Chen | G02B 21/06 359/385 |
| 2013/0162972 A1* | 6/2013 | Sesko | G01B 21/045 356/4.05 |
| 2013/0163006 A1* | 6/2013 | Sesko | G01B 11/026 356/609 |

* cited by examiner

COMBINED WORKPIECE HOLDER AND CALIBRATION PROFILE CONFIGURATION FOR PRECISION SURFACE PROFILE MEASUREMENT

BACKGROUND

Technical Field

This disclosure relates to precision metrology, and more particularly to precision surface profile measurement devices, and for such devices configured to produce surface profile measurements of objects with micron or sub-micron resolution and accuracy.

Description of the Related Art

Quality control of objects that include specific surface profiles produced by molding and/or machining, or the like, is becoming increasingly demanding in terms or throughput, measurement resolution, and accuracy. Such objects may include, but are not limited to, electronic components, miniature mechanical components, and optical components. For example, smart phone camera lenses are small, produced in very high volumes, and are expected to provide very good optical performance. Ideally, each such a lens should be inspected to insure proper function prior to assembly. Confirming a lens surface profile may insure proper optical performance, fit, etc. However, sub-micron level, or even nanometer level, surface profile measurement tolerances may be required in order to confirm a proper surface profile in some applications.

Various known contact or non-contact sensors may be used for such surface profile measurements. For example, one type of non-contact sensor that is suitable for such measurements is a chromatic point sensor, such as that disclosed in U.S. Pat. Nos. 9,958,266 and 7,876,456, which are hereby incorporated by reference in their entirety. Chromatic point sensors may provide the desired surface profile measurement resolution. However, various environmental instabilities such as vibration, temperature changes, and the like may contribute to errors that may arise, either in the sensor or elsewhere in the measurement setup, that affect the accuracy of a surface profile measurement, at the tolerance levels and accuracy required in various applications contemplated herein.

Various sensors, including chromatic point sensors, have been used in measurement setups that provide one-sided surface profile measurements and/or two-sided surface profile and/or thickness measurements. Calibration of such systems has been considered to some degree. For example, U.S. Pat. No. 9,958,266 discloses placing a gauge block of a known thickness between its parallel faces between first and second sensors that are subsequently used in a two-sided surface profile and/or thickness measurement system to measure features in silicon wafers. However, such a method only establishes a reference distance between the first and second sensors, and does not otherwise consider their individual accuracy, or various systematic or dynamic misalignments that may arise in the measurement setup. U.S. Pat. No. 5,973,772 discloses a two-sided surface profile and/or thickness measurement system comprising a lens holder that includes a reference portion that defines a reference thickness d0. On a front surface of the lens, a first sensor measures a profile measurement df relative to the reference portion. On a back surface of the lens, a second sensor measures a profile measurement db relative to the reference portion. The lens thickness d is indicated to as $d=df+d0+db$. However, such a method only establishes the reference thickness or distance d0 between the first and second sensors, and does not otherwise consider their individual accuracy or various systematic or dynamic misalignments that may arise in the measurement setup. Commonly assigned U.S. Pat. No. 7,400,414, which is hereby incorporated herein in its entirety, discloses a one-sided structured light surface profile measurement system that analyzes a line of structured light using known triangulation measurement principles to provide a 2D profile measurement across a workpiece. The measurement system is disclosed as comprising a reference object (e.g., a ramp with a known slope) which is located next to the workpiece and is included within each 2D profile measurement, to provide a reference object profile height or z height in each 2D profile measurement. The workpiece may be scanning along a third axis, such that multiple 2D profile measurements can be combined into a 3D profile measurement or profile map of the workpiece. It is disclosed that the proper relationship or distance between the multiple 2D profile measurements can be established along the third axis based on the reference object's known form and reference object profile height or z height in each 2D profile measurement. However, such a method only establishes a reference object profile height or z height in each 2D profile measurement, and does not otherwise consider the sensor accuracy or various systematic or dynamic misalignments that may arise in the measurement setup.

In various applications, it may be desirable for a surface profile measurement system to have improved measurement accuracy and/or "built in" measurement verification capability in order to provide more reliable and/or robust precision surface profile measurements under practical operating conditions.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

A combined workpiece holder and calibration profile configuration is disclosed, for integration into a contact or non-contact surface profile measurement system configured to measure a surface height coordinate for at least a front surface of a workpiece along a z height direction at a corresponding location coordinate along a profile scan path that is transverse to the z height direction. The combined workpiece holder and calibration profile configuration comprises at least a first calibration profile portion and a workpiece holding portion. The first calibration profile portion is located on a first side of the workpiece holding portion along a scan path direction of the profile scan path, and the first calibration profile portion comprises a plurality of reference surface regions that have known reference surface z heights or z height differences relative to one another. The workpiece holding portion is configured to hold a workpiece in a stable position during operation of the surface profile measurement. The first calibration profile portion and the workpiece holding portion are configured to fit within a profile scan path range of the surface profile measurement system, such that the surface profile measurement system can acquire measured surface profile data for at least the first calibration profile portion and the workpiece during a single pass along the profile scan path.

In some implementations, the combined workpiece holder and calibration profile configuration may further comprise a second calibration profile portion. In such implementations, the second calibration profile portion may be located on a second side of the workpiece holding portion along the scan path direction of the profile scan path. In some such implementations, the second calibration profile portion may comprise at least one reference surface region that has a known reference surface z height or known z height difference relative to the reference surface regions of the first calibration profile portion. In other such implementations the second calibration profile portion may comprise a plurality of reference surface regions that have known reference surface z heights or z height differences relative to one another.

In various implementations outlined above and described in greater detail below, that various reference surface regions may provide corresponding z height measurements while acquiring measured surface profile data for a workpiece. A sensor scale factor of a z height measurement sensor and/or a tilt of the combined workpiece holder and calibration profile configuration may be determined based on the z height data corresponding to the various reference surface regions. In various implementations, the determined scale factor or tilt may be used to identify erroneous measurement conditions corresponding to workpiece surface profile measurement data. In other implementations, the determined scale factor or tilt may be used to provide corrected workpiece surface profile measurement data.

Various other features and uses of a combined workpiece holder and calibration profile configuration are described further below.

DETAILED DESCRIPTION

Figure 1:
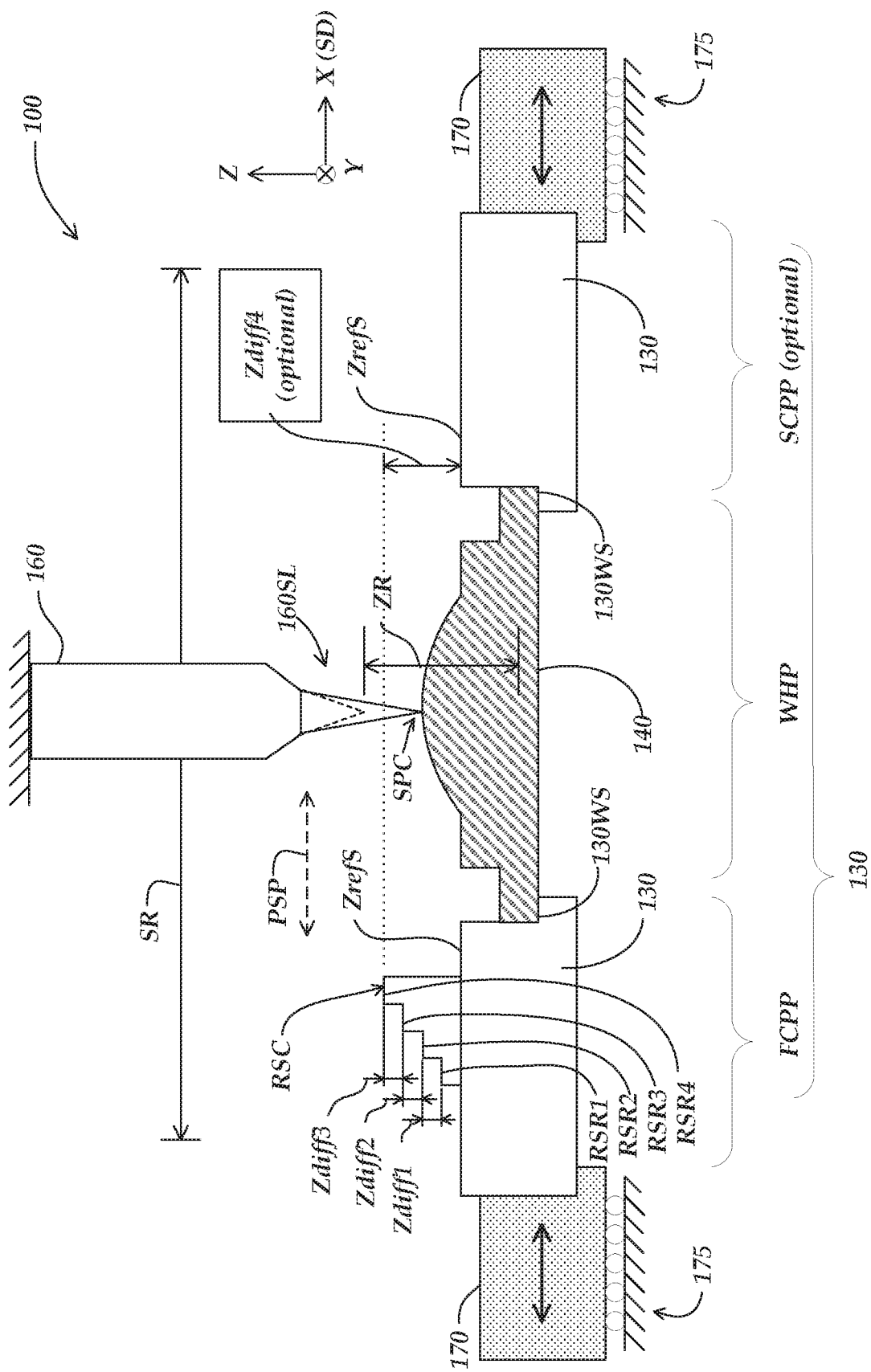
FIG. 1 is a partially schematic cross section diagram of a first exemplary implementation of a combined workpiece holder and calibration profile configuration integrated into a surface profile measurement system.

FIG. 1 is a partially schematic cross section diagram of a first exemplary implementation of a combined workpiece holder and calibration profile configuration 130 integrated into a contact or non-contact surface profile measurement system 100. The surface profile measurement system 100 may further comprise a surface height or range sensor 160, a motion-controlled stage 170 that carries the combined workpiece holder and calibration profile configuration 130 and moves on a bearing system 175 (e.g., in the X-Y plane). It should be appreciated that the sizes of some elements shown in FIG. 1 may be exaggerated relative to other elements, in order to more clearly illustrate and emphasize key elements and relationships that are more central to the features and principles disclosed and claimed herein.

The surface profile measurement system 100 is configured to measure surface profile coordinate SPC sets comprising a surface height coordinate (also referred to as a z height coordinate) along a z height direction at a corresponding location coordinate (e.g., an x coordinate for a 1-dimensional scan path) or coordinates (e.g., (x,y) coordinates for a 2-dimensional scan path), also referred to as scan path coordinates, along a profile scan path PSP transverse to the z height direction. In the illustrated implementation, surface height or range sensor 160 is a non-contact sensor (e.g., a chromatic point sensor) that is configured to sense a z height coordinate based on outputting and receiving reflected sensing light or radiation 160SL from the surface of the workpiece 140 at the measured surface profile coordinate SPC. The z height coordinate may be measured anywhere within a z height measuring range ZR of the surface height or range sensor 160. The x or (x,y) coordinates may be measured by motion control gauges or scales associated with the motion-controlled stage 170, or by separate gauges, according to known methods.

The combined workpiece holder and calibration profile configuration 130 comprises at least a first calibration profile portion FCPP and a workpiece holding portion WHP. The workpiece holding portion WHP is configured to hold a workpiece 140 in a stable position during a surface profile measurement scan (e.g., by locating and/or restraining the workpiece 140 against workpiece support(s) 130WS. In various implementations, the workpiece support(s) 130WS may be configured according to known kinematic design principles to locate a workpiece 140 in a desired orientation in a stable and repeatable manner. In some implementations, the combined workpiece holder and calibration profile configuration 130 may further comprise an (optional) second calibration profile portion SCPP, which is shown as an optional feature in FIG. 1 and described in greater detail below.

As shown in FIG. 1, the first calibration profile portion FCPP is located on a first side of the workpiece holding portion WHP along a scan path direction SD of the profile scan path PSP, and includes a reference surface configuration RSC that comprises a plurality of reference surface regions. In the implementation shown in FIG. 1, the plurality of reference regions comprise the four reference surface regions RSR1, RSR2, RSR3, and RSR4, which have known reference surface z heights and/or z height differences Zdiff1, Zdiff2, and Zdiff3 relative to one another. However, in other implementations, the plurality of reference regions may be as few as two reference regions, as described in greater detail below. In any case, it will be understood throughout this disclosure that operational reference surface regions referred to herein may be configured to be located within the z height measuring range ZR of the surface height or range sensor 160.

The first calibration profile portion FCPP and the workpiece holding portion WHP are configured to fit within a profile scan path range SR of the surface profile measurement system 100, such that the surface profile measurement system 100 can acquire measured surface profile data (e.g., a plurality of surface profile coordinate sets) for the first calibration profile portion FCPP (including the reference surface regions of the reference surface configuration RSCC) and the workpiece 140 (located in the workpiece holding portion WHP) during a single pass along the profile scan path PSP. In such a case, the calibration and/or accuracy of the z height measurement coordinates provided by the surface height or range sensor 160 for the workpiece 140 during a surface profile scan along the profile scan path PSP can be confirmed based on the z height measurement coordinates provided by the surface height or range sensor 160 for the reference surfaces in the first calibration profile portion FCPP during that same surface profile scan.

In contrast to prior art configurations for surface profile and/or thickness measurement, which are briefly outlined in the "BACKGROUND" section of this disclosure, the plurality of reference surface regions RSR located in the first calibration profile portion FCPP are configured to provide z height measurement data that is usable in a method to determine or confirm the measurement scale factor of the surface height or range sensor 160. Since the surface profile measurement z height coordinates of the workpiece 140 may be considered to be measurements relative to one another, a constant distance or "offset error" of the surface profile measurement z height coordinates may be self-compensating or unimportant with respect to measuring a workpiece surface profile in some applications. In contrast, a scale factor error in a set of surface profile measurement z height coordinates will exaggerate or diminish the apparent surface z heights at various locations along a scan path in a surface profile measurement, thereby distorting the surface profile measurement. In the context of precision or ultra-precision measurement, a sensor scale factor may vary significantly, for example, due to temperature variations affecting thermal expansion and/or material properties, or ambient air pressure variation affecting optical properties (for some sensing principles), or the like.

One method of operation related to determining or correcting such errors may comprise operating a surface profile measurement system as disclosed herein (e.g., the surface profile measurement system 100 including the combined workpiece holder and calibration profile configuration 130) to acquire measured surface profile data for the first calibration profile portion FCPP and the workpiece 140 during a single pass along the profile scan path PSP (e.g., over the profile scan range SR). A scale factor for a z height coordinate measurement sensor (e.g., the surface height or range sensor 160 of the surface profile measurement system 100) may be based on acquired measured surface profile data corresponding to the plurality of reference surface regions RSR included in the first calibration profile portion FCPP. Regarding a scale factor determination or confirmation in the illustrated example, Zdiff1 is the true z height difference between the reference surface regions RSR1 and RSR2. It may be characterized by measurement of the reference surface regions RSR1 and RSR2 using a known precise or ultra-precise measurement method on the combined workpiece holder and calibration profile configuration 130 outside the surface profile measurement system 100, for example. The value of Zdiff1 (or values for its constituent z heights for the reference surface regions RSR1 and RSR2) may be stored in a memory of the surface profile measurement system 100, or a host computer, or the like. z height measurements Zrsr1 and Zrsr2 may then be later determined for the reference surface regions RSR1 and RSR2 during a during a surface profile scan along the profile scan path PSP. It will be understood by one of ordinary skill in the art that:

$$[Zrsr2-Zrsr1]/Zdiff1=SFCC \quad \text{EQ. 1}$$

wherein, SFCC is designated a scale factor change coefficient.

Rearranging EQUATION 1:

$$[Zrsr2-Zrsr1]/SFCC=Zdiff1 \quad \text{EQ. 2}$$

EQUATION 2 shows that if each measured z height in surface profile measurement is corrected by dividing it by the scale factor change coefficient SFCC defined above, then the resulting corrected z height data in the associated surface profile will reflect the true or calibrated surface profile of the workpiece 140.

The foregoing analysis assumes a linear scale factor throughout the z height measuring range ZR of the surface height or range sensor 160. It will understood that if the scale factor is not linear, of if it is desired to have more than one determination or confirmation of the scale factor of the surface height or range sensor 160 throughout the z height measuring range ZR, similar scale factor change coefficients SFCC may be determined using additional reference surface regions RSR and associated Zdiff determinations (e.g., using the additional reference surface regions RSR3 and/or RSR4 and the associated differences Zdiff2 and/or Zdiff3 shown in FIG. 1). The use of such additional scale factor change coefficients SFCC over their respective applicable sub-ranges of z height measurement will be understood by analogy with the description above.

It will be appreciated that a reference surface configuration RSC may be fabricated as a separate element from a base portion of the combined workpiece holder and calibration profile configuration 130 in some implementations, and then affixed to the base portion. In other implementations, a reference surface configuration RSC may be fabricated as an element integrated with a base portion of the combined workpiece holder and calibration profile configuration 130 (e.g., as machined or turned from the same block of material).

In some implementations, the combined workpiece holder and calibration profile configuration 130 may be precisely planar between a region designated ZrefS in the first calibration profile portion FCPP, and a region designated ZrefS in the second calibration profile portion SCPP in FIG. 1. In such an implementation, the designated regions ZrefS may function as one of the plurality of reference surface regions included in the first and/or second calibration profile portions FCPP and/or SCPP according to principles disclosed herein. The workpiece support(s) 130WS may be fabricated to be parallel to the plane of the regions designated ZrefS. In some such implementations, the combined workpiece holder and calibration profile configuration 130 may be aligned such that the precisely planar regions are aligned with the x-y plane (perpendicular to the direction of z height measurement), which may be considered to be aligned in an "untilted" orientation, and the workpiece may be considered "untilted" when mounted to the workpiece support(s) 130WS. However, it will be appreciated that such alignment may be disturbed or hard to achieve in various applications, and it may be advantageous to acquire measurement data that determines or confirms the true amount of tilt associated with a surface profile scan along the profile scan path PSP.

In order to acquire measurement data that may be used to determine or confirm the true amount of tilt associated with a surface profile scan along the profile scan path PSP, in various implementations it is advantageous that the second calibration profile portion SCPP is located on a second side of the workpiece holding portion WHP along the scan path direction SD of the profile scan path PSP, and the second calibration profile portion SCPP comprises at least one reference surface region (e.g., the reference surface region ZrefS) that has a known reference surface z height or known z height difference relative to the reference surface regions of the first calibration profile portion FCPP. It will be appreciated that in the case illustrated in FIG. 1, and described above, the reference surface region ZrefS in the second calibration profile portion SCPP is fabricated to be coplanar with the reference surface region ZrefS in the first calibration profile portion SCPP, and therefore has the same reference surface z height and/or a known z height difference of zero. It is further advantageous if the first calibration profile portion, the workpiece holding portion, and the second calibration profile portion are configured to fit within a profile scan path range SR of the surface profile measurement system, such that the surface profile measurement system can acquire measured surface profile data for the first calibration profile portion, the workpiece, and the second calibration profile portion during a single pass along the profile scan path.

One method of operation related to determining or correcting such tilt errors may comprise operating a surface profile measurement system as disclosed herein (e.g., the surface profile measurement system 100 including the combined workpiece holder and calibration profile configuration 130) to acquire measured surface profile data for the first calibration profile portion FCPP and the workpiece 140 and the second calibration profile portion SCPP during a single pass along the profile scan path PSP (e.g., over the profile scan range SR). A tilt of the combined workpiece holder and calibration profile configuration 130 (relative to the z height measurement axis of the surface profile measurement system 100) may be based on acquired measured surface profile data corresponding to respective reference surface regions included in the first and second calibration profile portions FCPP and SCPP that have known z heights or a known z height difference relative to one another. In some such implementations, it is not necessary to know the distance between the scan path locations of the reference surface regions ZrefS in the first and second calibration profile portions FCPP and SCPP. It is sufficient to determine the difference between their measured z heights and compare it to an expected difference (e.g., a difference of zero, in the implementation shown in FIG. 1 and outlined above), to determine whether there is a tilt error included in the measured surface profile scan data. Such a tilt error may be used to flag or disqualify the measured surface profile scan data. In some alternative implementations, the distance between the locations of the reference surface regions ZrefS in the first and second calibration profile portions FCPP and SCPP may be known and/or determined based on coordinates provided by motion control measurement scales or other gauges that determine the scan path location and/or the surface profile coordinates SPC. In such a case, the amount of tilt associated with a set of surface profile measurement data may be determined explicitly. In some implementations, that set of surface profile measurement data may be corrected based on the previously outlined scale factor change coefficient and/or based on the explicitly determined amount of tilt, or both.

In the example outlined above, the reference surface region ZrefS in the second calibration profile portion SCPP has a known reference surface z height or known z height difference relative to the reference surface region ZrefZ in the first calibration profile portion FCPP. However, it will be appreciated that, more generally, one or more reference surface regions in the second calibration profile portion SCPP may have a known reference surface z height or known z height difference relative to a reference surface region included in the first calibration profile portion FCPP (e.g., based on precision measurement of the combined workpiece holder and calibration profile configuration 130 outside the surface profile measurement system 100, as previously outlined.) One of ordinary skill in the art will recognize that the various uses and operations outlined above in relation to scale factor and tilt may be adapted to use the known reference surface z heights and/or known z height differences associated with such configurations.

Figure 2:
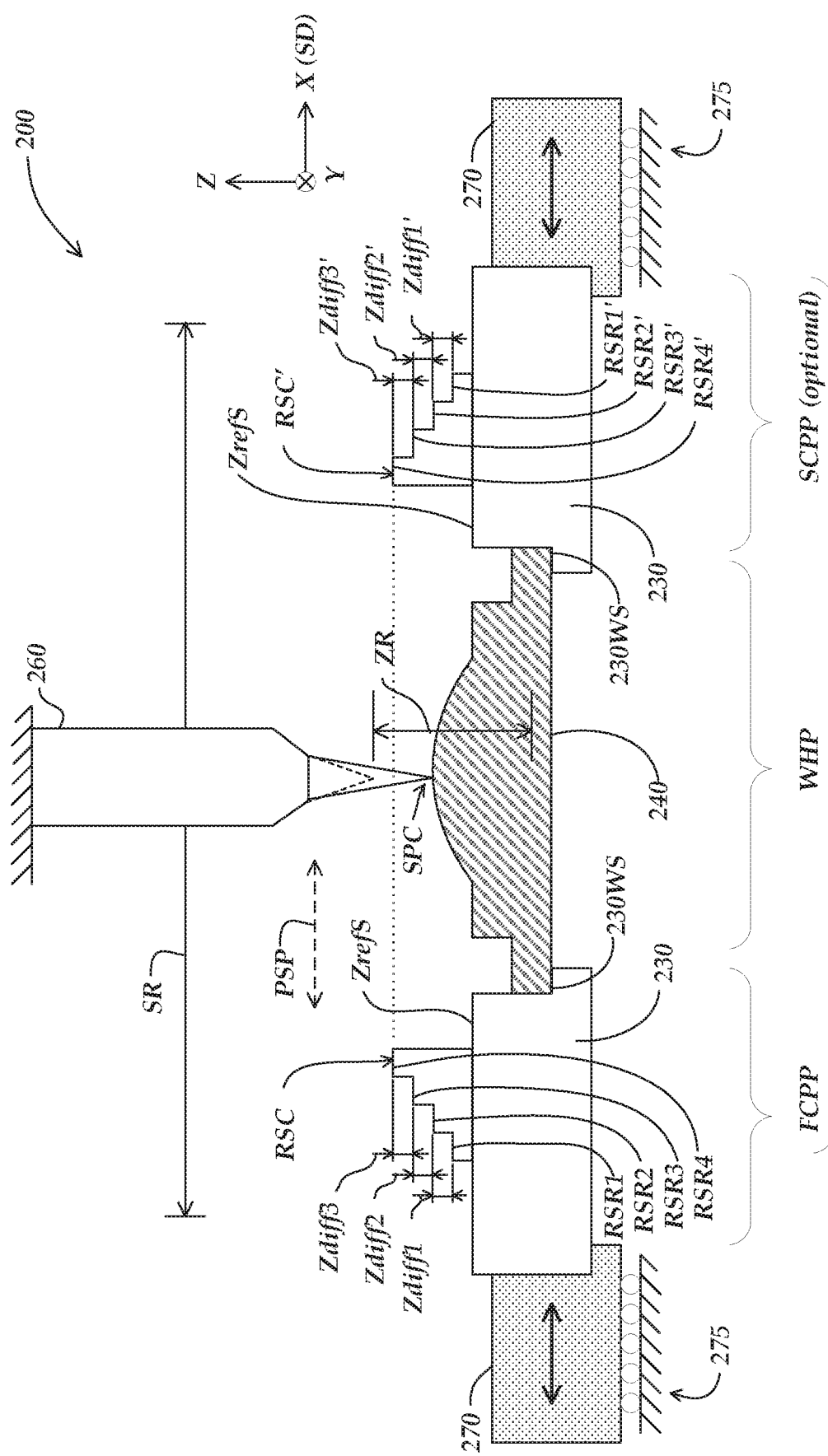
FIG. 2 is a partially schematic cross section diagram of a second exemplary implementation of a combined workpiece holder and calibration profile configuration integrated into a surface profile measurement system.

FIG. 2 is a partially schematic cross section diagram of a second exemplary implementation of a combined workpiece holder and calibration profile configuration 230 integrated into a contact or non-contact surface profile measurement system 200. FIG. 2 is similar to FIG. 1, and the combined workpiece holder and calibration profile configuration 230 is similar to the combined workpiece holder and calibration profile configuration 130, except for the presence of reference surface configuration RSC' having additional reference surface regions RSR1', RSR2', RSRT3' and RSR4' in the second calibration profile portion SCPP. Similar reference numbers 2XX in FIGS. 2 and 1XX in FIG. 1, and/or similar reference numbers XXX and XXX', may refer to similar elements, unless otherwise indicated by context or description.

Similarly to the implementation shown in FIG. 1, in the implementation shown in FIG. 2, the second calibration profile portion SCPP is located on a second side of the workpiece holding portion WHP along the scan path direction of the profile scan path PSP. The first calibration profile portion FCPP, the workpiece holding portion WHP, and the second calibration profile portion SCPP are configured to fit within the profile scan path range SR of the surface profile measurement system, such that the surface profile measurement system can acquire measured surface profile data for the first calibration profile portion, the workpiece, and the second calibration profile portion during a single pass along the profile scan path.

In the implementation shown in FIG. 2, the second calibration profile portion SCPP comprises a plurality of reference surface regions RSR that have known reference surface z heights or known z height differences relative to one another. By analogy with the description of various aspects of the implementation shown in FIG. 1, it will be understood that one or more additional scale factor change coefficients SFCC' that is/are analogous to scale factor change coefficient SFCC previously outlined with reference to EQUATION 1 and EQUATION 2, may be determined based on a plurality of reference surface regions RSR included in the second calibration profile portion SCPP. Such scale factor change coefficients SFCC' may be used an additional determination or confirmation of scale factor stability or instability during the acquisition of surface profile scan data. In some implementations, scale factor change coefficients may be averaged and used to correct a set of surface profile scan data. In other implementations, the scale factor change coefficients corresponding to the first and second calibration profile portions FCPP and SCPP may be compared, and any significant differences may indicate the associated set of surface profile data includes errors due to scale factor instability during the data acquisition. However, the foregoing examples of the use of measurement data arising from reference surface regions RSR in the first and/or second calibration profile portions FCPP and/or SCPP are exemplary only, and not limiting. Various other uses may be recognized by one of ordinary skill in the art based on the various principles and teachings disclosed herein.

Figure 3:
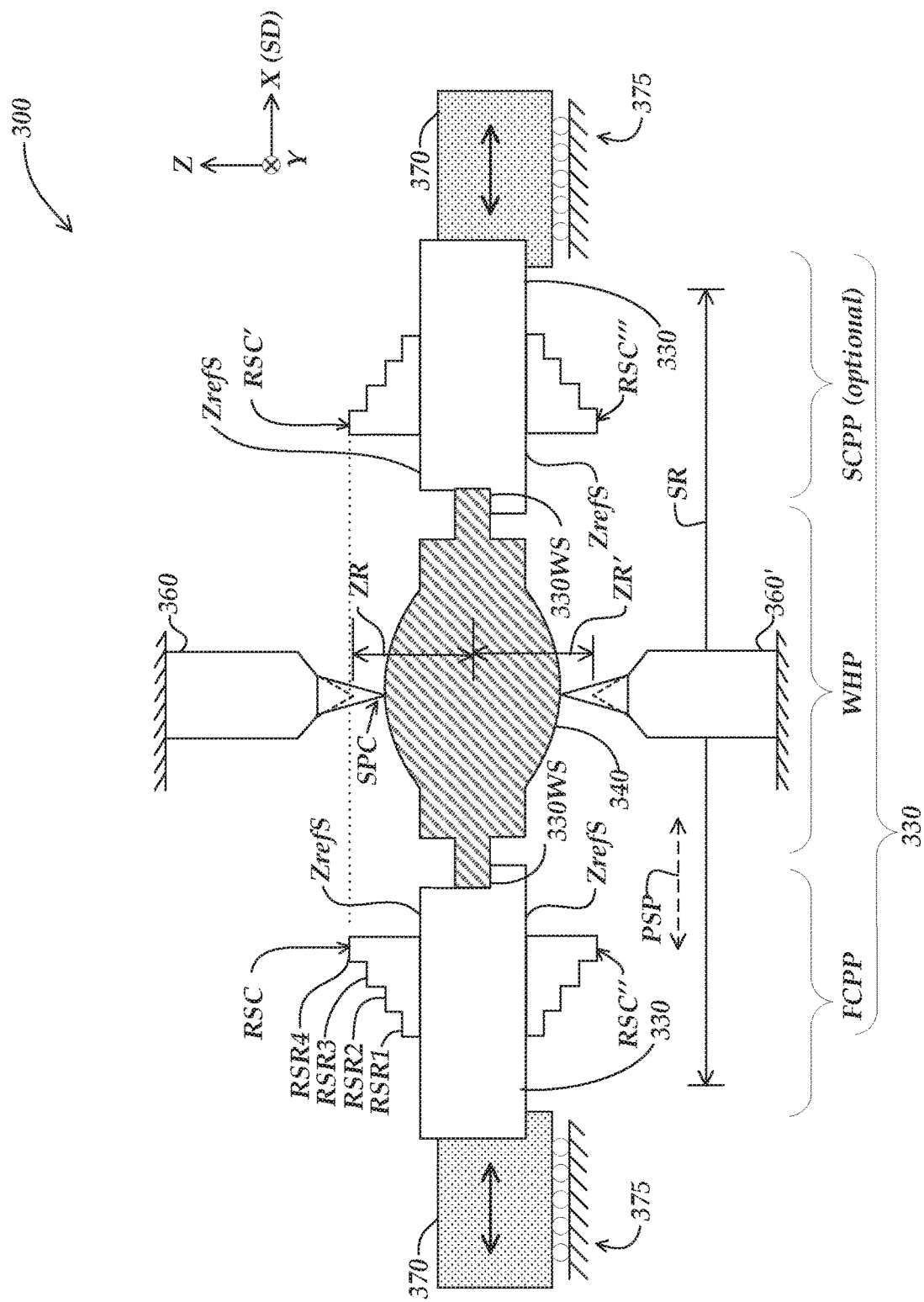
FIG. 3 is a partially schematic cross section diagram of a third exemplary implementation of a combined workpiece holder and calibration profile configuration integrated into a surface profile measurement system.

FIG. 3 is a partially schematic cross section diagram of a third exemplary implementation of a combined workpiece holder and calibration profile configuration 330 integrated into a contact or non-contact surface profile measurement system 300. FIG. 3 is similar to FIG. 1 and FIG. 2, and the combined workpiece holder and calibration profile configuration 330 is similar to the combined workpiece holder and calibration profile configurations 130 and/or 230, except that it is a "two surface" measuring configuration for simultaneously acquiring surface profile measurement data on the front (top) side and back (bottom) side of a two surface workpiece 340. Similar references numbers 3XX in FIGS. 3 and 1XX or 2XX in FIG. 1 or 2, respectively, may refer to similar elements unless otherwise indicated by context or description. Similar reference numbers XXX, XXX', XXX" and/or XXX'", may refer to similar elements unless otherwise indicated by context or description. The various elements located towards the positive z direction relative to (or above) the combined workpiece holder and calibration profile configuration 330 as illustrated in FIG. 3 may be characterized as a "front surface profiling subsystem" (e.g., the surface height or range sensor 360, and the reference surface configuration RSC and/or RSC'). The various elements located towards the negative z direction relative to (or below) the combined workpiece holder and calibration profile configuration 330 as illustrated in FIG. 3 may be characterized as a "back surface profiling subsystem" (e.g., the surface height or range sensor 360', and the reference surface configuration RSC" and/or RSC'").

By analogy with the description of various aspects of the implementations shown in FIGS. 1 and/or 2, it will be understood that scale factor change coefficients that is/are analogous to scale factor change coefficient SFCC previously outlined with reference to EQUATION 1 and EQUATION 2, may be determined for surface height or range sensor 360' in the back surface profiling subsystem based on the plurality of reference surface regions included in the reference surface configurations RSC" and/or RSC'" included on the back sides of the first and second calibration profile portions FCPP and/or SCPP. Such scale factor change coefficients may be used as a determination or confirmation of scale factor stability or instability for the back surface height or range sensor 360' during the acquisition of surface profile scan data for the back (or bottom) surface of the workpiece 340, according to principles previously outlined with reference to the "one surface" surface profiling configurations shown in FIGS. 1 and/or 2.

It will be understood that the particular "two surface" measuring configuration shown in FIG. 3 is exemplary only, and not limiting. For example, a further implementation of a two surface measuring configuration may be configured as a "two surface" version of the implementation(s) shown and described with reference to FIG. 1. Scale factor and/or tilt determinations may be made in relation to either the front surface profiling subsystem or the back surface profiling subsystem in such an implementation, according to previously outlined principles. More generally, either of the front or back surface profiling subsystems may comprise any of the "single surface" profile measurement system features and/or combined workpiece holder and calibration profile configurations disclosed herein. The front and back surface profiling subsystems need not be identical in various implementations.

It will be understood that the generic non-contact surface height or range sensor (e.g., the range sensor 160) illustrated in the figures herein is exemplary only and not limiting. It may be replaced by a precision contact type gauge (e.g., a commercially available linear gauge) in various implementations. In implementations where the surface profile measurement system 100 comprises a known type of computer-controlled coordinate measurement machine (CMM) or the like, it may be replaced by a precision touch probe mounted on the z axis moving element of the CMM, for example.

It will be understood that the particular methods of scale factor determination and z height measurement correction outlined with reference to EQUATIONS 1 and 2 are exemplary only and not limiting. Having the benefit of the various principles and teachings disclosed herein, one of ordinary skill in the art will understand that various alternative mathematical formulations or relationships may be devised to make use of measurement values derived from a combined workpiece holder and calibration profile configuration as disclosed herein.

Various embodiments described above can be combined to provide further embodiments. Any U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A combined workpiece holder and calibration profile configuration for integration into a contact or non-contact surface profile measurement system configured to measure a surface z height coordinate for at least a front surface of a workpiece along a z height direction at a corresponding location coordinate along a profile scan path that is transverse to the z height direction, the combined workpiece holder and calibration profile configuration comprising:
   at least a first calibration profile portion and a workpiece holding portion, wherein:
   the first calibration profile portion is located on a first side of the workpiece holding portion along a scan path direction of the profile scan path, the first calibration profile portion comprising a plurality of reference surface regions that have known reference surface z heights or z height differences relative to one another;
   the workpiece holding portion is configured to hold a workpiece in a stable position during operation of the surface profile measurement system; and
   the first calibration profile portion and the workpiece holding portion are configured to fit within a profile scan path range of the surface profile measurement system, such that the surface profile measurement system is configured to acquire measured surface profile data for at least the first calibration profile portion and the workpiece during a single pass along the profile scan path.

2. The combined workpiece holder and calibration profile configuration of claim 1, further comprising a second calibration profile portion, wherein:
   the second calibration profile portion is located on a second side of the workpiece holding portion along the scan path direction of the profile scan path, the second calibration profile portion comprising at least one reference surface region that has a known reference surface z height or z height difference relative to the reference surface regions of the first calibration profile portion; and
   the first calibration profile portion, the workpiece holding portion, and the second calibration profile portion are configured to fit within a profile scan path range of the surface profile measurement system, such that the surface profile measurement system is configured to acquire measured surface profile data for the first calibration profile portion, the workpiece, and the second calibration profile portion during a single pass along the profile scan path.

3. The combined workpiece holder and calibration profile configuration of claim 1, further comprising a second calibration profile portion, wherein:
the second calibration profile portion is located on a second side of the workpiece holding portion along the scan path direction of the profile scan path, the second calibration profile portion comprising a plurality of reference surface regions that have known reference surface z heights or z height differences relative to one another; and
the first calibration profile portion, the workpiece holding portion, and the second calibration profile portion are configured to fit within a profile scan path range of the surface profile measurement system, such that the surface profile measurement system is configured to acquire measured surface profile data for the first calibration profile portion, the workpiece, and the second calibration profile portion during a single pass along the profile scan path.

4. The combined workpiece holder and calibration profile configuration of claim 1, wherein the surface profile measurement system comprises at least one of a coordinate measuring machine, a chromatic range sensor, or a triangulation sensor.

5. The combined workpiece holder and calibration profile configuration of claim 1, wherein:
the surface profile measurement system is configured to measure a surface z height coordinate for the front surface of the workpiece and a back surface of the workpiece along the z height direction at a corresponding location coordinate along a profile scan path that is transverse to the z height direction, and
the combined workpiece holder and calibration profile configuration comprises the at least a first calibration profile portion and the workpiece holding portion, wherein:
the first calibration profile portion comprises a front surface subsystem plurality of reference surface regions that have known reference surface z heights or z height differences relative to one another, and which are located on a front surface of the first calibration profile portion;
the first calibration profile portion further comprises a back surface subsystem plurality of reference surface regions that have known reference surface z heights or z height differences relative to one another, and which are located on a back surface of the first calibration profile portion; and
the first calibration profile portion and the workpiece holding portion are configured to fit within the profile scan path range of the surface profile measurement system, such that a front surface subsystem of the surface profile measurement system is configured to acquire measured surface profile data for the front surface subsystem plurality of reference surface regions on the front surface of the first calibration profile portion and a front surface of the workpiece during a single pass along the profile scan path, and a back surface subsystem of the surface profile measurement system is configured to acquire measured surface profile data for the back surface subsystem plurality of reference surface regions on the back surface of the first calibration profile portion and a back surface of the workpiece during the single pass along the profile scan path.

6. A method for using a combined workpiece holder and calibration profile configuration for integration into a contact or non-contact surface profile measurement system configured to measure a surface z height coordinate for at least a front surface of a workpiece along a z height direction at a corresponding location coordinate along a profile scan path that is transverse to the z height direction, the method comprising:
providing the combined workpiece holder and calibration profile configuration integrated into the surface profile measurement system, the combined workpiece holder and calibration profile configuration comprising:
at least a first calibration profile portion and a workpiece holding portion, wherein:
the first calibration profile portion is located on a first side of the workpiece holding portion along a scan path direction of the profile scan path, the first calibration profile portion comprising a plurality of reference surface regions that have known reference surface z heights or z height differences relative to one another;
the workpiece holding portion is configured to hold the workpiece in a stable position during operation of the surface profile measurement system; and
the first calibration profile portion and the workpiece holding portion are configured to fit within a profile scan path range of the surface profile measurement system, such that the surface profile measurement system is configured to acquire measured surface profile data for the first calibration profile portion and the workpiece during a single pass along the profile scan path; and
operating the surface profile measurement system to acquire measured surface profile data for the first calibration profile portion and the workpiece during the single pass along the profile scan path.

7. The method of claim 6, further comprising determining a scale factor for a z height coordinate measurement sensor of the surface profile measurement system based on acquired measured surface profile data corresponding to the plurality of reference surface regions included in the first calibration profile portion.

8. The method of claim 7, further comprising correcting the surface z height coordinates in acquired measured surface profile data corresponding to a workpiece surface based on the determined scale factor.

9. The method of claim 6, wherein:
the provided combined workpiece holder and calibration profile configuration further comprises a second calibration profile portion, wherein:
the second calibration profile portion is located on a second side of the workpiece holding portion along the scan path direction of the profile scan path, the second calibration profile portion comprises at least one reference surface region that has a known reference surface z height or z height difference relative to the reference surface regions of the first calibration profile portion; and
the first calibration profile portion, the workpiece holding portion, and the second calibration profile portion are configured to fit within a profile scan path range of the surface profile measurement system, such that the surface profile measurement system is configured to acquire measured surface profile data for the first calibration profile portion, the workpiece, and the second calibration profile portion during a single pass along the profile scan path, and the method further comprises determining a tilt of the combined workpiece holder and calibration profile configuration based on acquired measured surface profile data corresponding to at least one reference surface region included in the first calibration profile portion and at least one reference surface region located in the second calibration profile portion.

10. The method of claim 9, further comprising correcting the surface z height coordinates in acquired measured surface profile data corresponding to a workpiece surface based on the determined tilt.

* * * * *